Patented Apr. 14, 1942

2,279,883

UNITED STATES PATENT OFFICE 2,279,883

INTERPOLYMERS OF DIHEXYL ITACONATE AND ETHYL METHACRYLATE

Gaetano F. D'Alelio, Pittsfield, Mass., assignor to General Electric Company, a corporation of New York No Drawing. Application September 12, 1939, Serial No. 294,495

2 Claims. (Cl. 260—78)

This invention relates to the production of new materials having valuable and characteristic properties that make them especially suitable for use in industry, for example in molding, laminating, coating, casting and adhesive applications and for other purposes. The invention is concerned more particularly with compositions of matter comprising an interpolymer of an ester of itaconic acid, in which at least one ester group contains at least six saturated carbon atoms in the alcohol residue, and at least one other polymerizable compound containing the structure

more particularly a

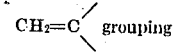 grouping

Specifically the invention is concerned with a composition comprising the product of polymerization of a mixture containing dihexyl itaconate and ethyl methacrylate in the ratio of 5 parts of the former to 95 parts of the latter, which polymerization product has a higher flexural strength than ethyl methacrylate when polmerized alone under similar conditions.

The new esters prepared and used in practicing this invention are itaconic esters in which at least one ester group contains more than five saturated carbon atoms in the alcohol residue. Examples of such esters are methyl hexyl itaconate,

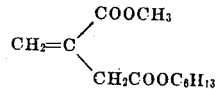

ethyl decyl itaconate

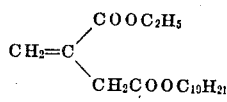

and mono-tetradecyl itaconate,

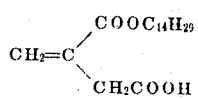

It will be observed that the first two are mixed esters. The preparation of mixed esters is in general somewhat difficult and complicated, involving extensive processing and high cost. The mono esters are not difficult to make but no particular advantages ordinarily accrue from their use in the production of interpolymers. Hence the preferred embodiment of this invention comprises the preparation, and utilization in the production of interpolymers, of esters of itaconic acid in which both ester groups are identical (symmetrical diesters). Illustrative of such esters are di-hexyl, di-heptyl, di-octyl, di-nonyl, di-decyl, di-undecyl, di-dodecyl, di-tridecyl, di-tetradecyl, di-pentadecyl, di-hexadecyl, di-heptadecyl and di-octadecyl itaconates. The mixed and symmetrical itaconic diesters with which this invention is especially concerned may be graphically expressed by the formula

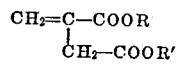

where R and R' are the same or different (preferably the same) alkyl radicals containing at least six straight- or branched-chain saturated carbon atoms in the alcohol residue.

In contrast to the hard and brittle polymeric itaconic esters previously reported, the polymerized esters of this invention vary from very plastic masses to waxy bodies, soluble in low molecular weight hydrocarbons. While they all undergo polymerization, the tendency to polymerize is, because of the high molecular weight, markedly reduced. Likewise, I have also discovered that the properties of these itaconic esters are especially adapted to copolymerization processes. In many technical applications certain polymeric bodies must be plasticized before they can be economically molded. Usually these plasticizers are volatile non-plastic bodies which tend to soften the material and decrease its heat resistance. Eventually some of the plasticizer is lost and the molded object distorts due to resultant strains. By practicing my invention these difficulties are also avoided. These new itaconic esters readily interpolymerize with other polymerizable bodies to achieve the required plastic flow for molding processes. It was surprisingly found that these interpolymers possessed a permanent plasticity so that, depending on the ratio of components in the copolymers, a wide range of properties could be obtained. For example, a copolymer of 5 parts di-octyl itaconate and 95 parts methyl methacrylate gave a hard, clear copolymer which, surprisingly, had practically the same impact strength, flexural strength, solvent- and heat-resistance as methyl methacrylate when polymerized alone. Yet, this copolymer indicated a much higher degree of plastic flow under heat and pressure than polymeric methyl methacrylate. Furthermore, it could be remolded an indefinite number of times without loss of this property. Through the use of higher quantities of these new esters, permanently flexible interpolymers may be prepared. These and other advantages will be better understood as the description of the invention proceeds.

In carrying the present invention into effect the normal and isomeric forms of aliphatic mono- and di-esters of itaconic acid containing more than five saturated carbon atoms in the alcohol residue of the ester grouping may be polymerized separately, or mixed with each other, or mixed with other polymerizable material. The homogeneous and heterogeneous polymers vary from viscous masses to rubbery and hard, solid bodies, depending upon the extent of polymerization and the particular polymerizable or other modifying agent, if any, which is incorporated therewith. Heat, light, or heat and light may be used to effect polymerization, although under such conditions the rate of polymerization is relatively slow. Hence, to accelerate the polymerization, I prefer to use a catalyst, accompanied by heat, light, or heat and light. Examples of catalysts which may be used are oxygen, ozone, hydrogen peroxide, sulfuric acid, aluminum chloride, boron fluoride, superoxides such as aliphatic acyl peroxides, e. g., acetyl peroxide, stearyl peroxide, etc., peroxides of the aromatic acid series, e. g., benzoyl peroxide. Benzoyl peroxide is the preferred catalyst because of its ease of handling, its relative freedom from explosive hazards and its ready solubility in the monomeric or partially polymerized itaconic esters. The rate of polymerization is a function of the temperature and may be carried out at from room temperature (20°-30° C.) to temperatures materially above 100° C., for example about 130° C.

The monomeric itaconic esters from dihexyl to dioctadecyl, inclusive, when polymerized alone, form thermoplastic materials, that is, materials the shape of which easily can be changed by heat. The softening point, solubility and other properties of these new itaconic esters depend upon the number of carbon atoms in, and the structure of, the ester chain. In general, the longer the ester chain, the lower is the softening point of the polymer. Some of the completely polymerized esters are clear, colorless, very viscous masses. Others are soft, free-flowing, viscous masses at temperatures of about 100° C., yet highly waxy or soft, slightly mobile masses at room temperature. Some possess properties intermediate brittle solids and dense, mobile, viscous masses.

In many applications the normally viscous, mobile polymers of high plastic flow are exceptionally valuable, particularly where non-volatilizing materials that can accommodate themselves to the form of the container are required. Particularly are they valuable when used alone, or when dissolved or dispersed in other dielectric materials including a liquid hydrocarbon such as mineral oil. This property of high plastic flow can be used to great commercial advantage in molding processes by interpolymerizing these monomers with other bodies of low plastic flow, thereby imparting the desired flow characteristics the end-product.

In other applications, for example where it is desired to raise the softening point, to decrease the brittleness and the solubility, or to produce insoluble, infusible products, this may be done by copolymerizing a selected monomeric or partially polymerized ester of this invention with polymerizable unsaturated materials in monomeric or partially polymerized state, for example, an ester of a polybasic acid in which at least two ester groups each contain an unsaturated hydrocarbon radical, more particularly a

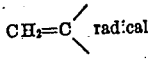

such as vinyl, allyl, methallyl, etc. Copolymers of valuable properties may be obtained by copolymerizing the itaconic esters of this invention with other monomeric or partly polymerized itaconic esters, for example dimethyl itaconate, diethyl itaconate, itaconic esters of unsaturated alcohols, for instance diallyl itaconate, etc., vinyl and allyl esters of saturated and unsaturated mono- and poly-carboxylic acids, more particularly with polymerizable materials containing a

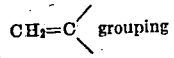

for instance monomeric or partly polymerized styrene, vinyl esters such as the acetate, chloride, bromide, fluoride, etc., vinyl ketones, methvinyl ketones, vinylidene halides as the chloride, bromide and fluoride, acrylic and methacrylic esters, e. g., methyl acrylate, ethyl acrylate, propyl acrylate, butyl acrylate, methyl methacrylate, ethyl methacrylate, propyl methacrylate, butyl methacrylate, etc.

As illustrative of the differences in properties resulting from interpolymerizing the itaconic esters with which this invention is concerned with other polymerizable materials, the following is mentioned:

Di-octyl itaconate which had been polymerized in the presence of 1% by weight benzoyl peroxide for about 3 days at approximately 70° C. showed considerable flow at room temperature. This same material when polymerized under the same conditions with only 20% diallyl itaconate formed a firm, non-flowing gel in one hour and set within 3 days to a hard, clear, colorless, highly heat-resistant copolymer that was insoluble in solvents, such as acetone and benzene, in which di-octyl itaconate that similarly was polymerized alone was soluble.

As a further illustration of the differences resulting through copolymerization, the following is given:

A solution of 95 parts ethyl methacrylate was treated in the presence of 0.25 part by weight benzoyl peroxide with 5 parts, respectively, of each of the following: di-hexyl itaconate, di-octyl itaconate, di-tetradecyl itaconate, di-hexadecyl itaconate and di-octadecyl itaconate for 15 hours at 55° C. and for 24 hours at 85° C. In all cases, copolymers of extreme ductility were obtained so that their flexural strengths could not be measured. Their impact strengths (Dynstat) in foot pounds were, respectively, 0.133, 0.146, 0.123, 0.140 and 0.158. Ethyl methacrylate, polymerized alone under similar conditions, broke under a flexural stress of 7450 pounds per square inch and had an impact strength of 0.135 foot pound.

Even when the above compositions were copolymerized with, for example, diallyl itaconate to give copolymers of increased solvent-resistance, heat-resistance, or heat- and solvent-resistance, as for instance a copolymer prepared from 5 parts di-hexyl itaconate or di-octadecyl itaconate, 95 parts ethyl methacrylate and 0.7 part diallyl itaconate, the ductile properties were still retained.

Various methods may be used to prepare the esters with which this invention is concerned. For example, they may be prepared by ester exchange reactions in the presence of a suitable inhibiting agent, such as phenolic bodies, copper, etc., and a suitable catalyst, the reaction proceeding as in an alcoholysis. Thus, in the preparation of, for instance, dihexyl itaconate, the reactants may comprise hexyl alcohol and dimethyl or diethyl itaconate, hydroquinone as an inhibiting agent and a catalyst such as metallic sodium, potassium carbonate, sulfuric acid, etc. The esters of this invention also may be prepared from itaconic nitrile by causing to react therewith an alcohol, corresponding to the ester desired, in the presence of water and an inorganic acid. Or, they may be made from itaconyl chloride and a selected alcohol, or by decomposition of a corresponding ester of citric or citraconic acids or one of their derivatives.

A preferred method of preparation is by direct esterification of itaconic acid with the selected alcohol in the presence of an esterification catalyst, with or without the presence of other unreactive bodies to remove the water resulting from esterification. This method may be carried out continuously.

Mixed esters of this invention, that is itaconic esters in which the ester groups are different, also may be prepared in various ways. Illustrative of such esters are methyl hexyl itaconate, ethyl octyl itaconate, hexyl decyl itaconate, propyl octadecyl itaconate and butyl tetradecyl itaconate. These mixed esters may be prepared, for instance, by effecting reaction between itaconic monoester acid chloride and a selected alcohol in the presence or absence of an inhibiting agent such as phenolic bodies, copper, etc. They also may be made by ester exchange reactions in the presence of a suitable catalyst, using an ester of a lower boiling alcohol, such as dimethyl or diethyl itaconate and an alcohol corresponding to the ester desired.

Another method of preparation of these mixed esters is from itaconic monoacid chloride and a selected alcohol, followed by direct esterification of the other acid radical by another alcohol. These mixed esters also may be made by direct consecutive esterification of each of the carboxyl groups with different alcohols, or by treating itaconic diacid chloride first with one alcohol, then with another. They also may be prepared by saponification of one group of an itaconic diester with alcoholic potassium hydroxide in the cold and either isolating the monoacid from the potassium salt for further reaction with the selected alcohol or causing the potassium salt to react directly with an alkyl sulfate corresponding to the ester desired.

In order that those skilled in the art better may understand how the present invention may be carried into effect, the following illustrative examples are given of the preparation of these new esters and of various compositions comprising the same. All parts are by weight. All the itaconic esters containing more than five carbon atoms in the alkyl radical referred to in the examples are symmetrical diesters.

Preparation of esters

A solution of 32.5 parts itaconic acid, 38 parts n-hexyl alcohol, 0.5 part p-toluene sulfonic acid and 200 parts benzene were reacted in a continuous esterification apparatus until no more water of reaction was collected. The benzene solution was washed with sodium carbonate solution and distilled water and dried over anhydrous sodium carbonate. The benzene and alcohol were distilled off and hexyl itaconate, boiling at 184°–187° C. at 8 mm. pressure, was obtained.

Other esters similarly prepared were:

| | |
|---|---|
| Octyl itaconate | B. P. 195°–197.5° C. at 2 mm. B. P. 215°–225° C. at 18 mm. |
| Decyl itaconate | B. P. 215°–225° C. at 1–1.5 mm. |
| Dodecyl itaconate | B. P. 220°–240° C. at 1–1.5 mm. |
| Tetradecyl itaconate | B. P. 243°–272° C. at 1–1.5 mm. Crystallized at room temp. |
| Hexadecyl itaconate | B. P. 231°–284° C. at 1–1.5 mm. Crystallized at room temp. |
| Octadecyl itaconate | Solid (isolated by crystallization). |

When treated with 1% benzoyl peroxide at 70°–100° C., very viscous polymers were obtained with the exception of the tetradecyl, hexadecyl and octadecyl esters, which were waxy products.

Example 1

The following two-component systems were treated with 0.25% benzoyl peroxide for the time indicated at 55° C. and 85° C. to give the tabulated copolymer.

| | Components | Copolymerization time in hours At 55° C. | Copolymerization time in hours At 85° C. | Characteristics of copolymer |
|---|---|---|---|---|
| (a) | 5 parts hexyl itaconate / 95 parts ethyl methacrylate | 15 | 24 | Hard, translucent. |
| (b) | 5 parts octyl itaconate / 95 parts ethyl methacrylate | 15 | 24 | Hard, clear. |
| (c) | 5 parts decyl itaconate / 95 parts ethyl methacrylate | 15 | 24 | Do. |
| (d) | 5 parts dodecyl itaconate / 95 parts ethyl methacrylate | 15 | 24 | Soft, translucent. |
| (e) | 5 parts tetradecyl itaconate / 95 parts ethyl methacrylate | 39 | 24 | Hard, clear. |
| (f) | 5 parts hexadecyl itaconate / 95 parts ethyl methacrylate | 15 | 24 | Hard, translucent. |
| (g) | 5 parts octadecyl itaconate / 95 parts ethyl methacrylate | 15 | 24 | Do. |

Example 2

The following two-component systems were treated with 0.25% benzoyl peroxide for the time indicated at 55° C. and 85° C. to give the tabulated copolymers except when other conditions are specified.

| | Components | Copolymerization time in hours At 55° C. | Copolymerization time in hours At 85° C. | Characteristics of copolymer |
|---|---|---|---|---|
| (a) | 95 parts methyl methacrylate / 5 parts hexyl itaconate | 15 | 24 | Hard, translucent. |
| (b) | 5 parts octyl itaconate / 95 parts methyl methacrylate | 15 | 24 | Hard, clear. |
| (c) | 5 parts decyl itaconate / 95 parts methyl methacrylate | 15 | 24 | Hard, clear. |
| (d) | 5 parts dodecyl itaconate / 95 parts methyl methacrylate | 15 | 24 | Hard, translucent. |
| (e) | 5 parts tetradecyl itaconate / 95 parts methyl methacrylate | 15 | 24 | Do. |
| (f) | 5 parts hexadecyl itaconate / 95 parts methyl methacrylate | 15 | 24 | Do. |
| (g) | 5 parts octadecyl itaconate / 95 parts methyl methacrylate | 15 | 24 | Hard, clear. |
| (h) | 1 part octadecyl itaconate / 99 parts glycol dimethacrylate | 1% benzoyl peroxide at 70° C. for 24 hrs. | | Hard, translucent, thermosetting. |
| (i) | 1 part octadecyl itaconate / 99 parts methallyl methacrylate | 1% benzoyl peroxide at 70° C. for 24 hrs. | | Hard, clear, thermosetting. |
| (j) | 1 part octadecyl itaconate / 99 parts dimethyl itaconate | 1% benzoyl peroxide at 70° C. for 24 hrs. | | Hard, translucent. |
| (k) | 1 part octadecyl itaconate / 99 parts diethyl itaconate | 1% benzoyl peroxide at 70° C. for 24 hrs. | | Hard, clear, colorless. |
| (l) | 1.75 parts octadecyl itaconate / 7.5 parts methyl methacrylate | 1% benzoyl peroxide at 70° C. for 24 hrs. | | Hard, translucent. |
| (m) | 5 parts octyl itaconate / 5 parts vinyl acetate | 1% benzoyl peroxide at 70° C. for 15 hrs. | | Clear, rubbery. |

|   | Components | Copolymerization time | | Characteristics of copolymer |
|---|---|---|---|---|
|   |   | At 55° C. | At 85° C. |   |
| (n) | 50 parts octyl itaconate<br>50 parts vinyl acetate | 1% benzoyl peroxide at 70° C. for 48 hrs. | | Clear, colorless, rubbery. |
| (o) | 50 parts octyl itaconate<br>50 parts styrene | 1% benzoyl peroxide at 70° C. for 72 hrs. | | Soft, cloudy. |
| (p) | 80 parts octyl itaconate<br>20 parts diallyl itaconate | 1% benzoyl peroxide at 70° C. for 72 hrs. | | Gel-like, firm, clear, thermosetting. |
| (q) | 1 part octadecyl itaconate<br>99 parts diallyl itaconate | 1% benzoyl peroxide at 70° C. for 24 hrs. | | Hard, clear, colorless, thermosetting. |
| (r) | 50 parts octyl itaconate<br>50 parts methyl methacrylate | 1% benzoyl peroxide at 70° C. for 48 hrs. at 96 hrs. | | Translucent, soft, rubbery, slightly soft, clear. |

Unless otherwise stated, the interpolymers of this example are themoplastic. The addition of as little as 0.1 part of a polyallyl ester of a polycarboxylic acid, specifically diallyl itaconate, to the mixed monomers results in interpolymers of increased solvent-resistance, heat-resistance or heat- and solvent-resistance.

*Example 3*

The following compositions were treated with 0.25% benzoyl peroxide for 60 hours at 55° C. and 24 hours at 85° C.

|   |   | Characteristics of copolymer |
|---|---|---|
| (a) | 5 parts hexyl itaconate<br>95 parts ethyl methacrylate<br>0.7 part diallyl itaconate | Hard, translucent |
| (b) | 5 parts octyl itaconate<br>95 parts ethyl methacrylate<br>0.7 part diallyl itaconate | Hard, clear, colorless |
| (c) | 5 parts decyl itaconate<br>95 parts ethyl methacrylate<br>0.7 part diallyl itaconate | Hard, clear |
| (d) | 5 parts dodecyl itaconate<br>95 parts ethyl methacrylate<br>0.7 part diallyl itaconate | Hard, translucent |
| (e) | 5 parts tetradecyl itaconate<br>95 parts ethyl methacrylate<br>0.7 part diallyl itaconate | Hard, clear |
| (f) | 5 parts hexadecyl itaconate<br>95 parts ethyl methacrylate<br>0.7 part diallyl itaconate | Hard, clear |
| (g) | 5 parts octadecyl itaconate<br>95 parts ethyl methacrylate<br>0.7 part diallyl itaconate | Hard, clear |

*Example 4*

This example illustrates the production of copolymers wherein at least one of the components is in a partially polymerized state prior to copolymerization. The partial polymer is indicated by P. The components were treated with 1% benzoyl peroxide at 70° C. for the time indicated.

|   | Components | Copolymerization time in hours | Characteristics of copolymer |
|---|---|---|---|
| (a) | 50 parts P octyl itaconate<br>50 parts methyl acrylate | 36 | Clear, soft, rubbery. |
| (b) | 50 parts P octyl itaconate<br>50 parts P methyl acrylate | 36 | Clear, viscous. |
| (c) | 50 parts P octyl itaconate<br>50 parts methallyl methacrylate | 36 | Hard, clear, thermosetting. |
| (d) | 50 parts P octyl itaconate<br>50 parts glycol dimethacrylate | 36 | Hard, opaque, thermosetting. |
| (e) | 50 parts P octyl itaconate<br>50 parts P methyl methacrylate | 48 | Tough, translucent, slightly soft. |
| (f) | 50 parts P octyl itaconate<br>50 parts P ethyl acrylate | 48 | Soft, rubbery, clear. |

Unless otherwise stated, the interpolymers of this example are thermoplastic. The addition of as little as 0.1 part of a polyallyl ester of a polycarboxylic acid, specifically diallyl itaconate, to the mixed monomers results in copolymers of increased solvent-resistance, heat-resistance, or solvent- and heat-resistance.

The diallyl itaconate of Examples 2 and 3, the glycol dimethacrylate of Examples 2 and 4, and the methallyl methacrylate of Examples 2 and 4 may be increased or may be replaced in whole or in part by substances such, for instance, as allyl and methallyl esters of polybasic acids, for example by diallyl carbonate, diallyl oxalate, diallyl malonate, diallyl succinate, diallyl glutarate, diallyl adipate, diallyl pimelate, diallyl suberate, diallyl azelaate, diallyl sebacate, diallyl alpha dimethyl malonate, diallyl alpha allyl malonate, diallyl maleate, diallyl fumarate, diallyl phthalate, diallyl tartrate, triallyl citrate, triallyl carballylate, diallyl citraconate, diallyl mesaconate, diallyl glutaconate, diallyl hydromucate, diallyl glutinate, tetra-allyl symmetrical tetracarboxylate, etc.; by other polyhydric alcohol and unsaturated alcohol esters of acrylic and methacrylic acids, for example, glycol acrylate, allyl acrylate, methallyl acrylate, allyl methacrylate, etc.; or by mixtures of such substances.

The itaconic esters of this invention, as well as the interpolymers obtained by copolymerizing these esters with other polymerizable bodies, have a wide range of properties. Their hardness and solubilities may be varied over a considerable range from fluid compositions of varied intrinsic viscosity or soft, flexible bodies to hard, rigid masses that can be swelled or dissolved in many volatile and non-volatile solvents, even those of a hydrocarbon nature. By suitable selection of the starting monomeric or partly polymerized materials, interpolymers can be obtained in an insoluble, infusible state practically resistant to the destructive effect of other chemical bodies such as acids, bases, solvents and the like.

When a plasticizing effect is desired in some other synthetic or natural plastic or potentially plastic material, the itaconic esters of this invention are particularly suited for that purpose. High molecular weight bodies such as polyvinyl chloride, cellulose esters such as the acetate, propionate, butyrate, etc., cellulose ethers, such as methyl cellulose, ethyl cellulose, benzyl cellulose, etc., polymerized methyl methacrylate, polystyrene, etc., may be plasticized by incorporating therewith these new itaconic esters in a monomeric, partially polymerized or completely polymerized state, in the presence or absence of a catalyst such as benzoyl peroxide when the monomeric or partially polymerized forms are used. The itaconic esters may be incorporated into the high molecular weight body by simple mechanical agitation or by the use of mutual solvents, followed by the standard mechanical processes known to the plastics art. These bodies then may be subjected to further heat and pressure treatment if desired.

The esters of this invention may be converted to polymers or interpolymers in molds with or without the application of pressure, in the presence or absence of a material which is a solvent for the monomer but not for the polymer, or one which is a solvent for both monomer and polymer, or one which is not a solvent for either the monomer or polymer so that spongy or granulated polymeric modifications are obtained.

The solid, thermoplastic polymers and copolymers of this invention, with or without modifying agents, may be used in injection, compression, or transfer molding processes to make numerous articles for industrial, technical and novelty use and other applications.

As modifying agents, various fillers may be used, for example, wood flour, alpha flock, sand, asbestos, mica, paper, cloth, cellulose derivatives such as cellulose itself, regenerated cellulose, cellulose esters, cellulose ethers, natural and synthetic filaments or fibers, etc., in continuous, shredded, or comminuted form. Pigments, dyes, opacifiers, plasticizing substances, such as dibutyl phthalate, esters of monobasic and polybasic saturated and unsaturated acids, esters of aromatic monobasic and polybasic acids, etc., may be incorporated into the polymers and copolymers of this invention to modify the same. Synthetic and natural resins, gums, oils, waxes, polyhalogenated aromatic derivatives, etc., likewise may be added as modifying agents.

In solvents, or without solvent utilizing a melt process, the fusible polymers may be used in adhesive and laminating applications to bond paper, wood, mica flakes, glass sheets, rubber sheets, fibrous materials such as silk, asbestos, glass fibers in filament, thread or fabric (woven or felted) form, cellulose derivatives in sheet, comminuted or fiber form, etc. In the form of liquid coating compositions such as varnishes, lacquers, enamels, etc., they find application in surface protective coatings, such as for walls, desks, wire, concrete, porcelains, etc. In a flowable condition without the use of solvents they may be used as impregnants for many porous bodies, such as cork, pottery, felts, or fabricated bodies with interstices, such as the windings of electrical coils, netted fiber, interwoven fibrous materials, etc.

When the monomers of this invention are copolymerized with, for example, diallyl itaconate in the presence of another non-polymerizable body which acts as a solvent for these monomers, there results a homogeneous gelled material which firmly binds the solvent so as to reduce to a minimum evaporation losses of the solvent. Illustrative of non-polymerizable bodies which thus may be gelled are butyl alcohol, benzene, ethylene dichloride, the monohalogenated aromatic hydrocarbons or mixtures of halogenated aromatic hydrocarbons, ethylene glycol, mineral oils including lubricating oils, etc.

What I claim as new and desire to secure by Letters Patent of the United States is:

1. The method of producing an interpolymer having a higher flexural strength than polymeric ethyl methacrylate which comprises forming a mixture containing monomeric dihexyl itaconate and ethyl methacrylate in the ratio of 5 parts of the former to 95 parts of the latter and, in addition to said monomers, a small amount of a polymerization catalyst, and heating the said mixture to produce a solid interpolymer.

2. A composition comprising the product of polymerization of a mixture containing dihexyl itaconate and ethyl methacrylate in the ratio of 5 parts of the former to 95 parts of the latter, said polymerization product having a higher flexural strength than ethyl methacrylate when polymerized alone under similar conditions.

GAETANO F. D'ALELIO.